G. A. Wing.
Hay Loader.
No. 102,744.          Patented. May. 3, 1870.
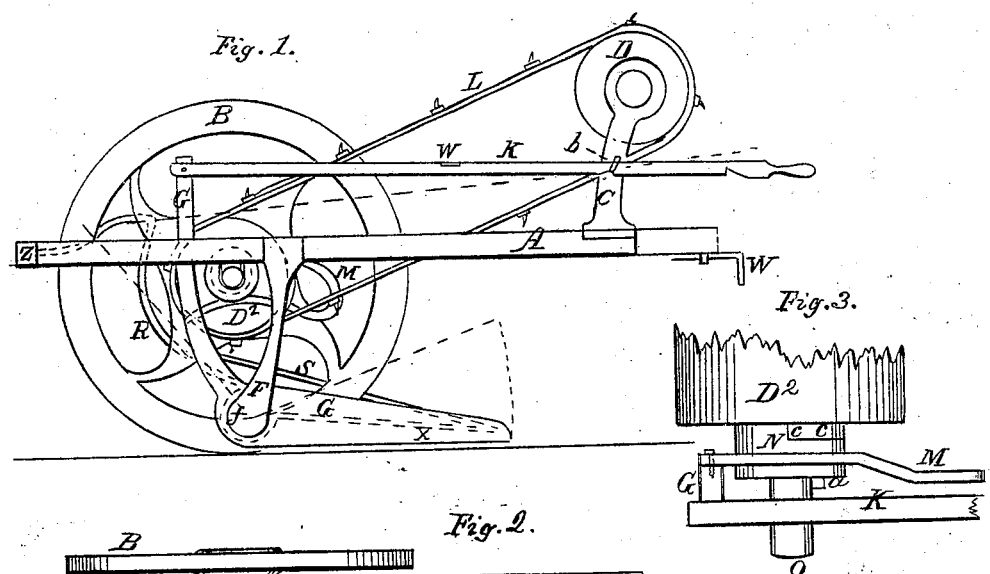
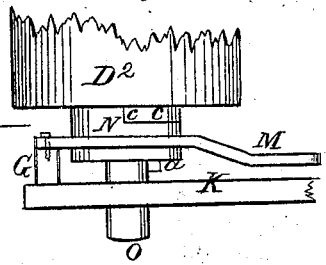
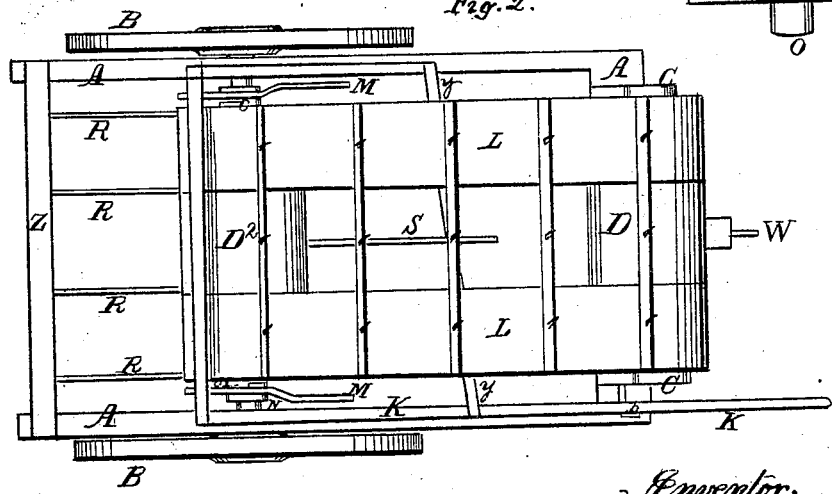
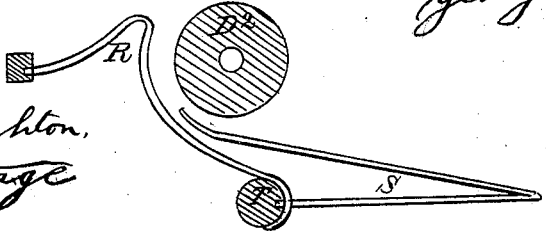
Witnesses.
Thomas Houghton,
J. H. Armatage
Inventor.
George. A. Wing

United States Patent Office.

GEORGE A. WING, OF ALBANY, NEW YORK.

Letters Patent No. 102,744, dated May 3, 1870.

IMPROVED HAY-RAKE AND LOADER.

The Schedule referred to in these Letters Patent and making part of the same.

I, GEORGE A. WING, of Albany, in the county of Albany and State of New York, have invented certain Improvements in Hay-Rake and Loaders, of which the following is a specification.

The principal object of my invention relates to the manner of causing the endless belt used as the loader to be set in motion or stopped, as may be required, so that, when passing from one part of the field to another, the loader may have its driving-mechanism easily detached from the driving-power.

Another object of my invention relates to the construction and arrangement of the basket into which the hay is gathered by the rake, previous to its being carried up by the endless belt or loader.

Another object of my invention relates to the combination and arrangement of the various parts of a hay-rake and loader, so as to produce a good and useful implement for agriculturists.

In the accompanying drawings—

Figure 1 is a side elevation of a machine embodying my invention.

Figure 2 is a plan of the same.

Figure 3 is a plan of the mechanism employed to engage and disengage the roller $D^2$ to and from the axle O.

Figure 4 is an elevation of driving-roller $D^2$ for endless belt, basket R, and rake S, showing their relative positions and arrangement.

A is the frame of the machine, made of the form shown in the accompanying drawings, and in the usual manner.

B B are the driving wheels, which are fastened to the axle O, so as to cause the axle to rotate with them.

$D^2$ is a roller fitted loosely upon axle O, so as not to be rotated by it unless connected to it by means of special mechanism, as will be hereinafter more fully explained.

F is a bracket secured to the side of frame A, and extending downward nearly to the ground, for the purpose of forming a support for rake-head T and bent lever G, as shown in fig. 1.

G is a bent lever, having its fulcra near the bottom of bracket F.

Near the front end of lever G is a friction-roller, X, to keep this end off the ground.

K is the operating lever, one end of which is attached to the top end of bent lever G.

Near the front end of lever K may be notches, which fit over a wire, $b$, projecting from standard C, for the purpose of retaining lever K in the proper position necessary to lower or raise the rake-teeth S, as may be required.

L is an endless belt, constructed in the usual well-known manner.

Said endless belt L is supported upon rollers $D^2$ and D, and driven by the former, which is connected to the axle O by coupling N, as shown in figs. 2 and 3.

M is a cam-loop, which is attached to the back part of bent lever G, as shown in figs. 1 and 3.

The opening in said loop M is such as to embrace and fit easily into a groove in the periphery of coupling N, as shown in fig. 1.

N is a sleeve-coupling, and it slides back and forth upon axle O, and rotates with said axle.

One part of coupling N is attached to the end of roller $D^2$, and the other part, which is operated by loop M, is fitted to slide upon the axle O, and is caused to rotate with said axle, by means of projection $a$ upon the axle, which slides into a similarly-shaped recess within coupling N, in the usual well-known manner.

R is a basket for the reception of the hay, as it is raked up by the machine.

Basket R is constructed of wire or other suitable material. Its general form may be such as shown in fig. 4.

It will also be seen in the same figure that the upper ends of the basket are secured to cross-brace Z, and their lower ends embrace the rake-head T.

S are the rake-teeth, shaped as shown in fig. 4, and attached to rake-head T.

T is the rake-head, the ends of which are atttached to the bent levers G.

The axle or center of motion of said rake-head T and bent lever G is at $f$, near the lower part of bracket F, as shown in fig. 1.

W is a hook, by which the machine may be attached to a wagon.

To use this machine, it will be necessary first to attach it by hook W to the wagon in which the hay is to be loaded, having previously pushed back the operating lever K, until coupling N is disengaged from roller $D^2$, which operation will also, at the same time, partially rotate the rake-head T, thus causing the points of rake-teeth S to be elevated from the ground.

In this position the machine can be taken to any place desired, without danger of breaking or injuring the rake-teeth, and without causing the endless belt or apron to revolve.

When required to rake and load the hay, it will be necessary only to pull forward the lever K, which will engage the driving-roller $D^2$ with rotating axle O, and also lower the rake-teeth S, so that, when the machine is drawn over they hay to be gathered, it will be raked up and loaded by this machine at one and the same time.

I claim as my invention—

1. The combination of sleeve-coupling N, cam-loop M, operating-lever K, and bent lever G with rollers D² and D, and endless belt or apron L, substantially as herein shown and set forth.

2. The combination and arrangement of basket R and rake-teeth S with rake-head T, substantially as herein shown and specified.

3. The combination and arrangement of sleeve-coupling N, cam-loop M, operating-lever K, bent lever G, rollers D² and D, and endless belt L, with basket R, rake-teeth S, and rake-head T, substantially as and for the purpose herein specified.

GEORGE A. WING.

Witnesses:
   THOMAS HOUGHTON,
   J. H. ARMATAGE.